United States Patent [19]
Henderson

[11] Patent Number: 5,653,479
[45] Date of Patent: Aug. 5, 1997

[54] VACUUM SEAL FOR A BALL JUNCTION

[75] Inventor: David E. Henderson, Fremont, Calif.

[73] Assignee: VLSI Technology, Inc., San Jose, Calif.

[21] Appl. No.: 595,760

[22] Filed: Feb. 2, 1996

[51] Int. Cl.$^6$ ................................................ F16L 27/067
[52] U.S. Cl. ................. 285/261; 285/99; 285/106; 285/270; 277/100; 118/733
[58] Field of Search ................... 277/100; 118/733, 118/715; 285/261, 99, 106, 270

[56] References Cited

U.S. PATENT DOCUMENTS

| | | | |
|---|---|---|---|
| 3,944,263 | 3/1976 | Arnold | 285/106 X |
| 4,726,689 | 2/1988 | Pollock | 277/71 X |
| 5,133,561 | 7/1992 | Hattori et al. | 277/72 R X |
| 5,359,148 | 10/1994 | Okase et al. | 118/733 X |
| 5,368,648 | 11/1994 | Sekizuka | 277/3 X |
| 5,533,736 | 7/1996 | Yamaga | 277/72 R X |

*Primary Examiner*—Terry Lee Melius
*Assistant Examiner*—Heather Shackelford
*Attorney, Agent, or Firm*—Wagner, Murabito & Hao

[57] ABSTRACT

A vacuum seal for a ball junction between a low pressure chemical vapor deposition (LPCVD) chamber and a vacuum system. In one implementation, the LPCVD chamber is a quartz tube used for deposition of certain chemicals onto and into semiconductor substrates placed therein. The ball junction is formed by the combination of a ball socket coupled at the neck of the LPCVD chamber and a metal ball cover coupled to the vacuum system. In one implementation, the metal ball cover is stainless steel. In lieu of using an elastomer O-ring that can denature under certain temperature ranges, the novel vacuum seal contains a series of annular channels cut into the inside surface of a ball cover. When the ball socket is inserted into the metal ball cover, the channels are bounded by metal on three sides and by the outside surface of the ball socket on the fourth side. Each channel contains a hole coupled to a second vacuum system. The channels are evacuated by the second vacuum system such that the outside surface of the ball socket seals with the inside surface of the metal cover. This vacuum seal is sufficient to contain a rough vacuum (e.g., 760 Torr to 1 m Toro required during LPCVD. Since the O-ring is eliminated, there is no need to temperate regulate the novel ball junction to prevent the O-ring from denaturing and temperatures can be maintained at the ball junction to prevent unwanted sublimation from chamber chemicals (e.g., ammonium chloride).

17 Claims, 9 Drawing Sheets

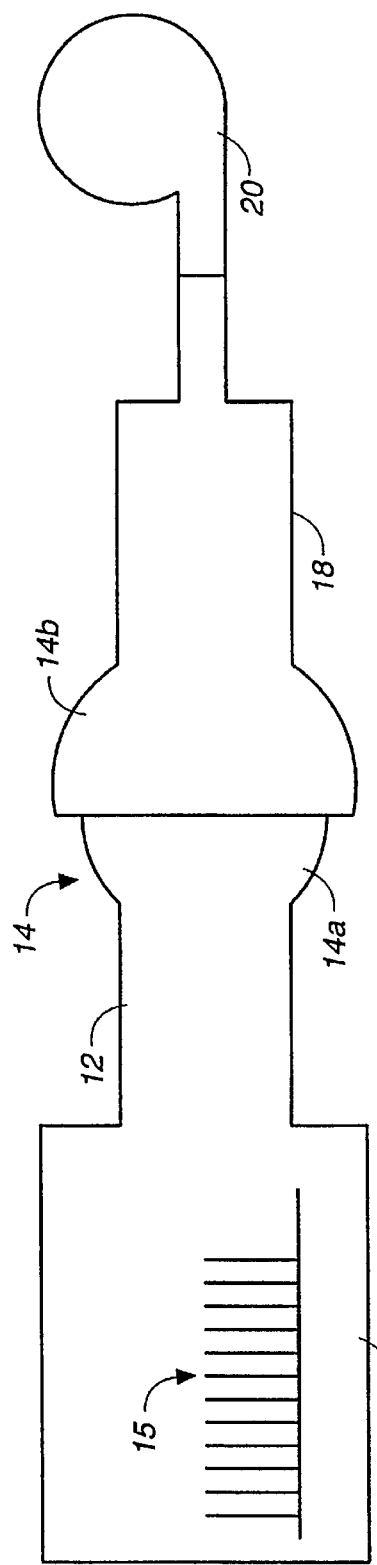
FIG._1 (PRIOR ART)
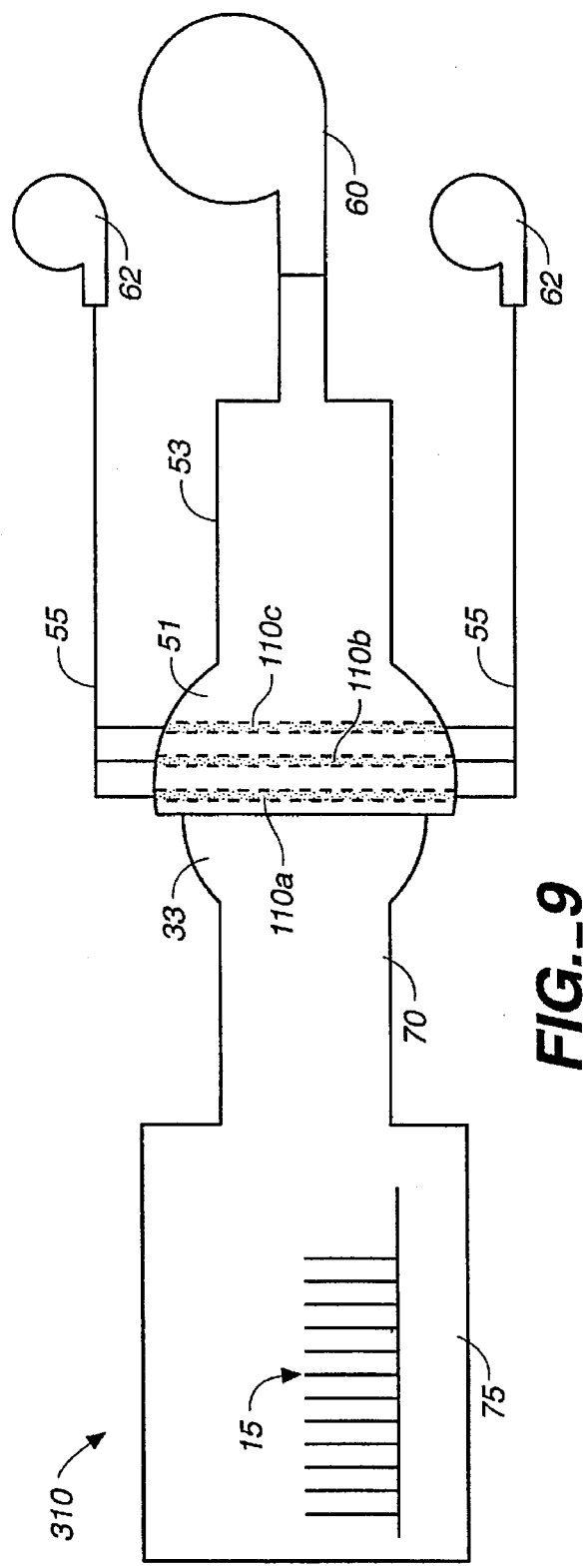
FIG._9

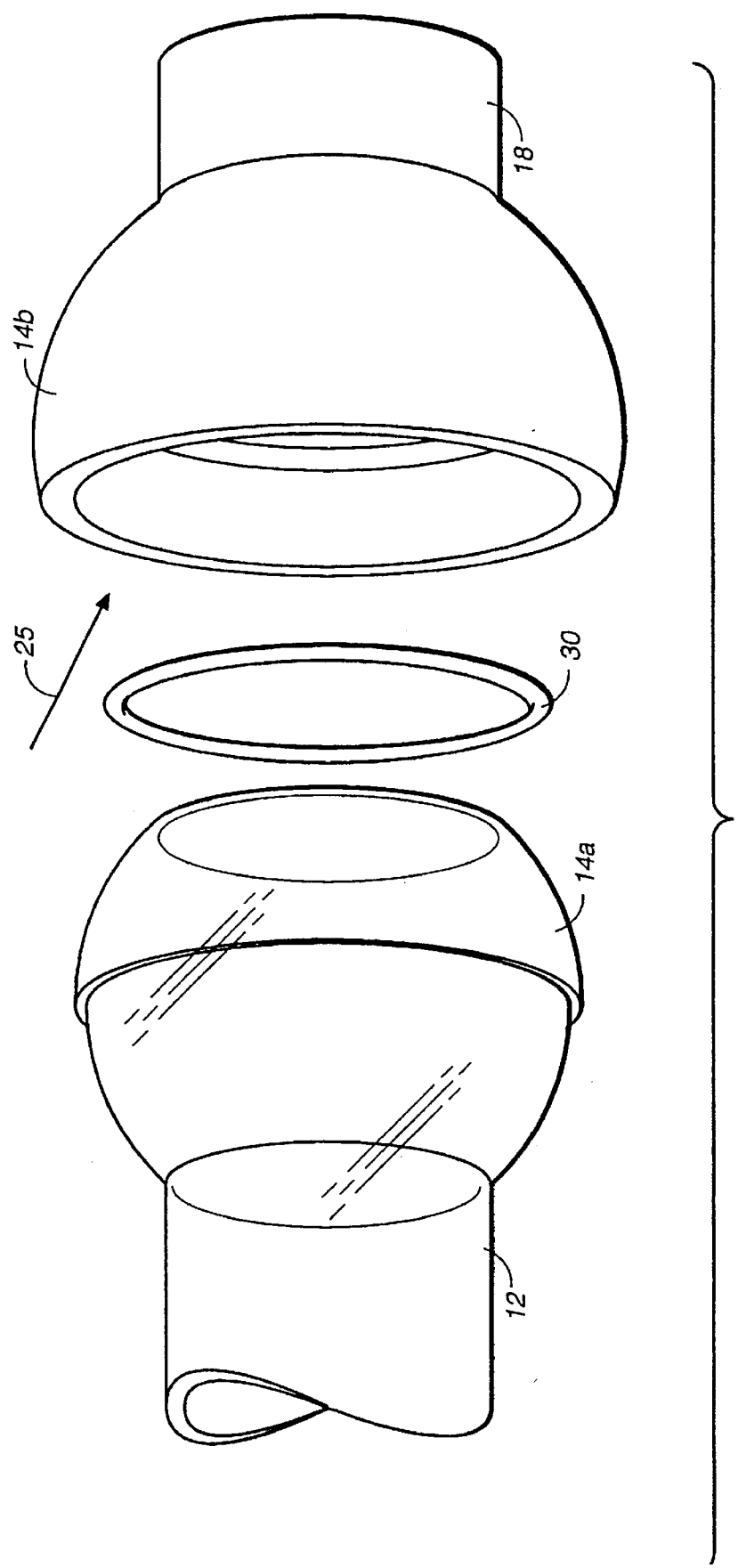
FIG._2 (PRIOR ART)

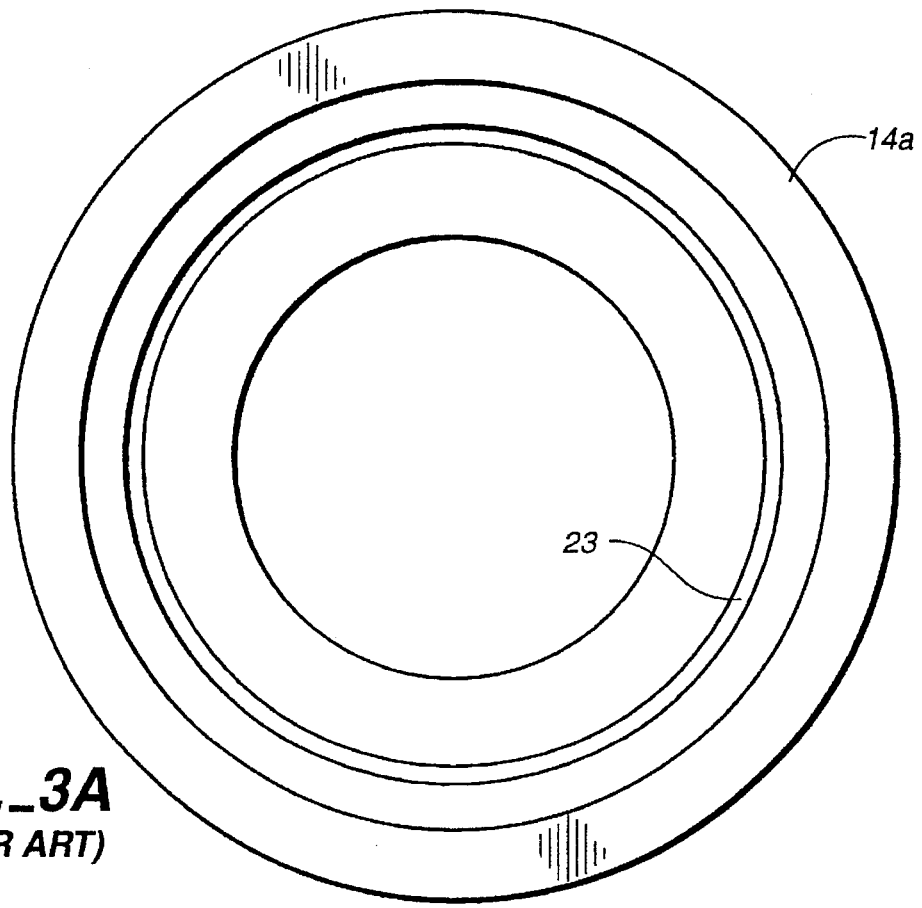
FIG._3A
(PRIOR ART)
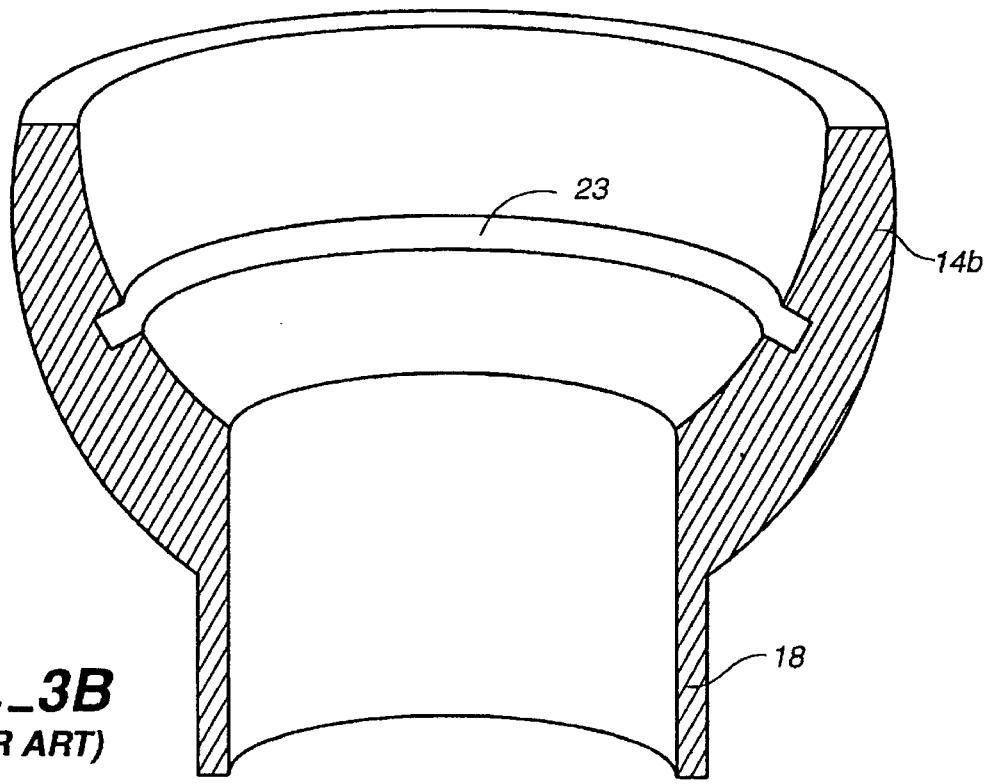
FIG._3B
(PRIOR ART)

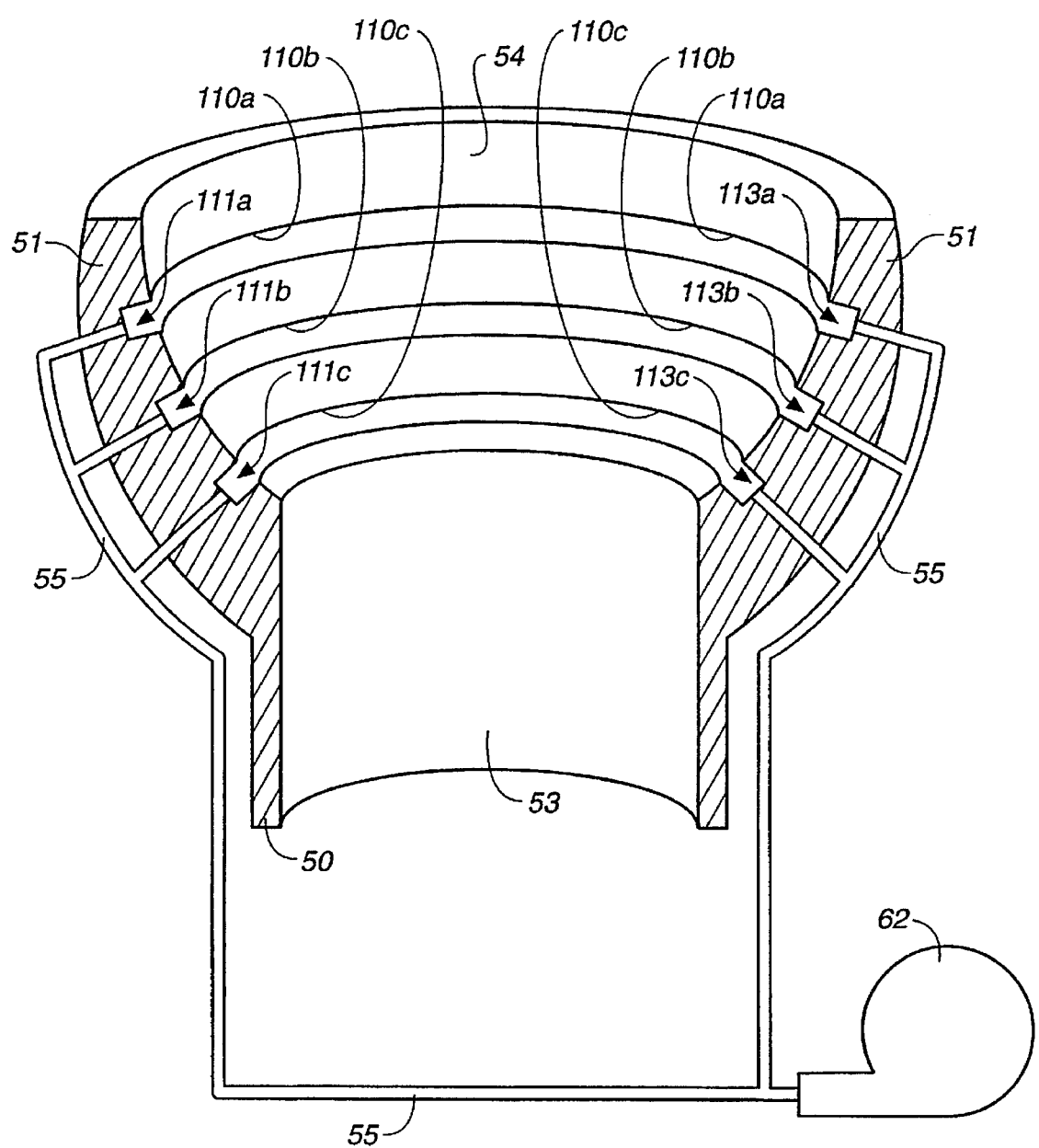
FIG._4A

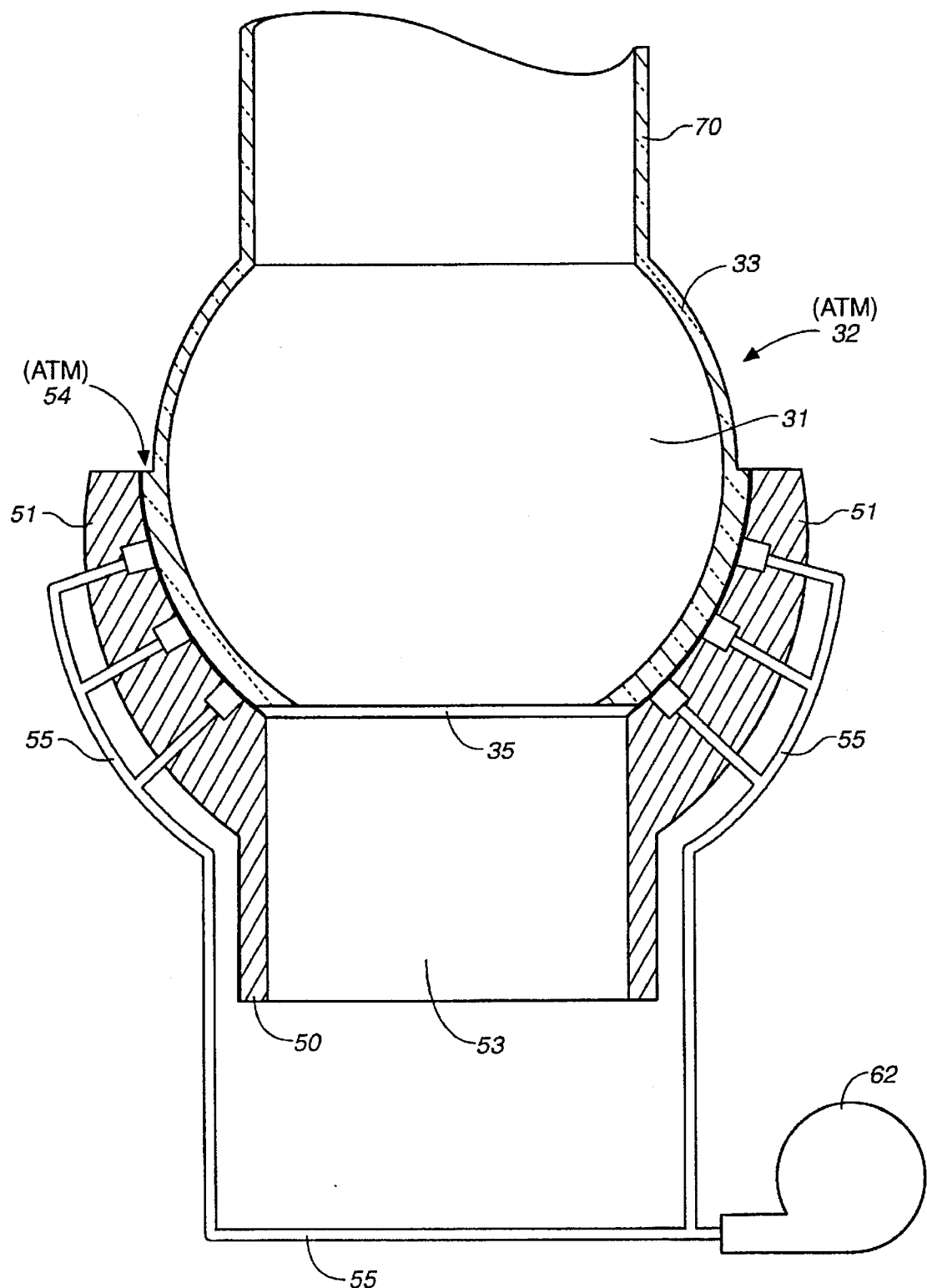
FIG._4B

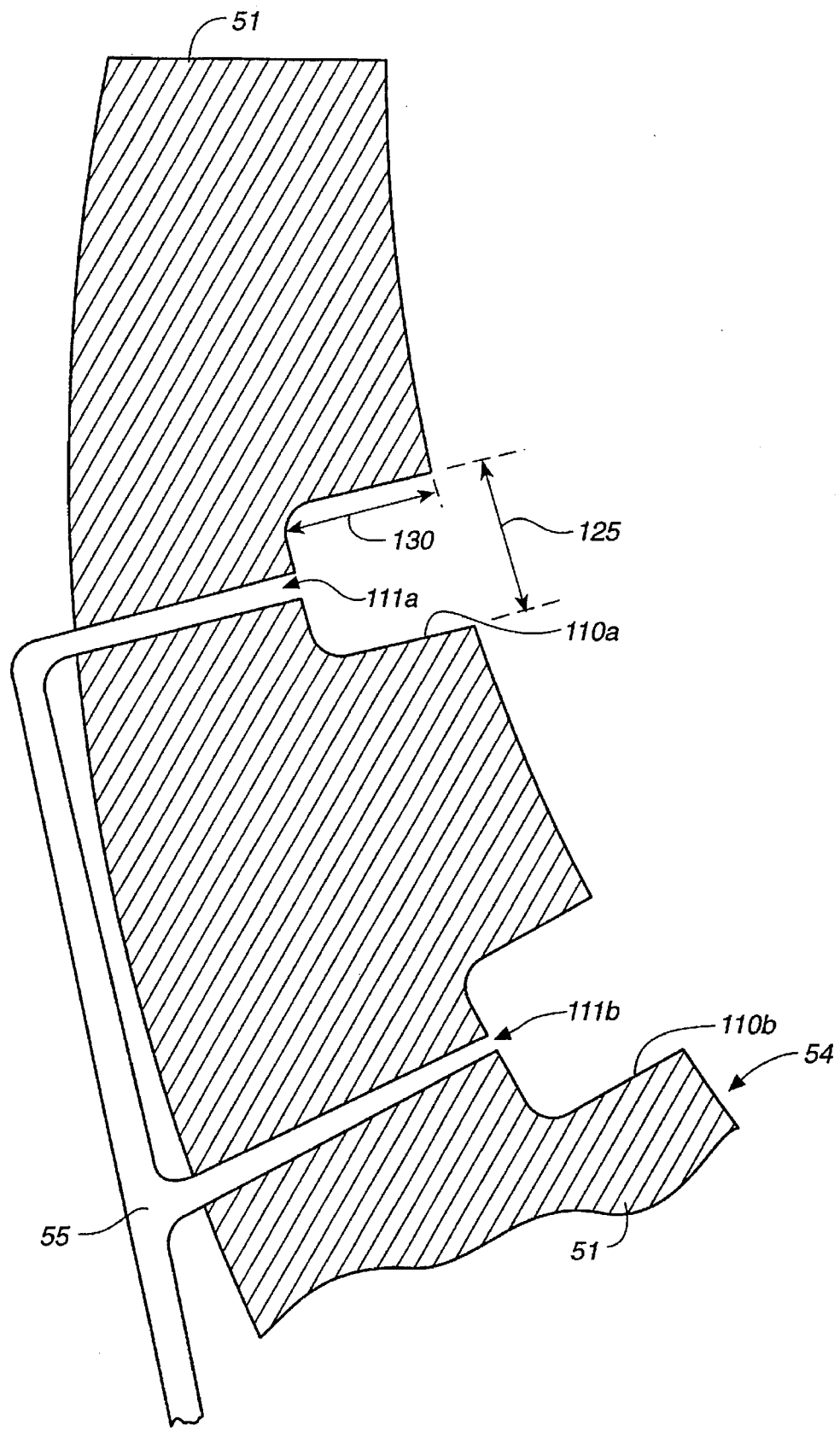
FIG._5

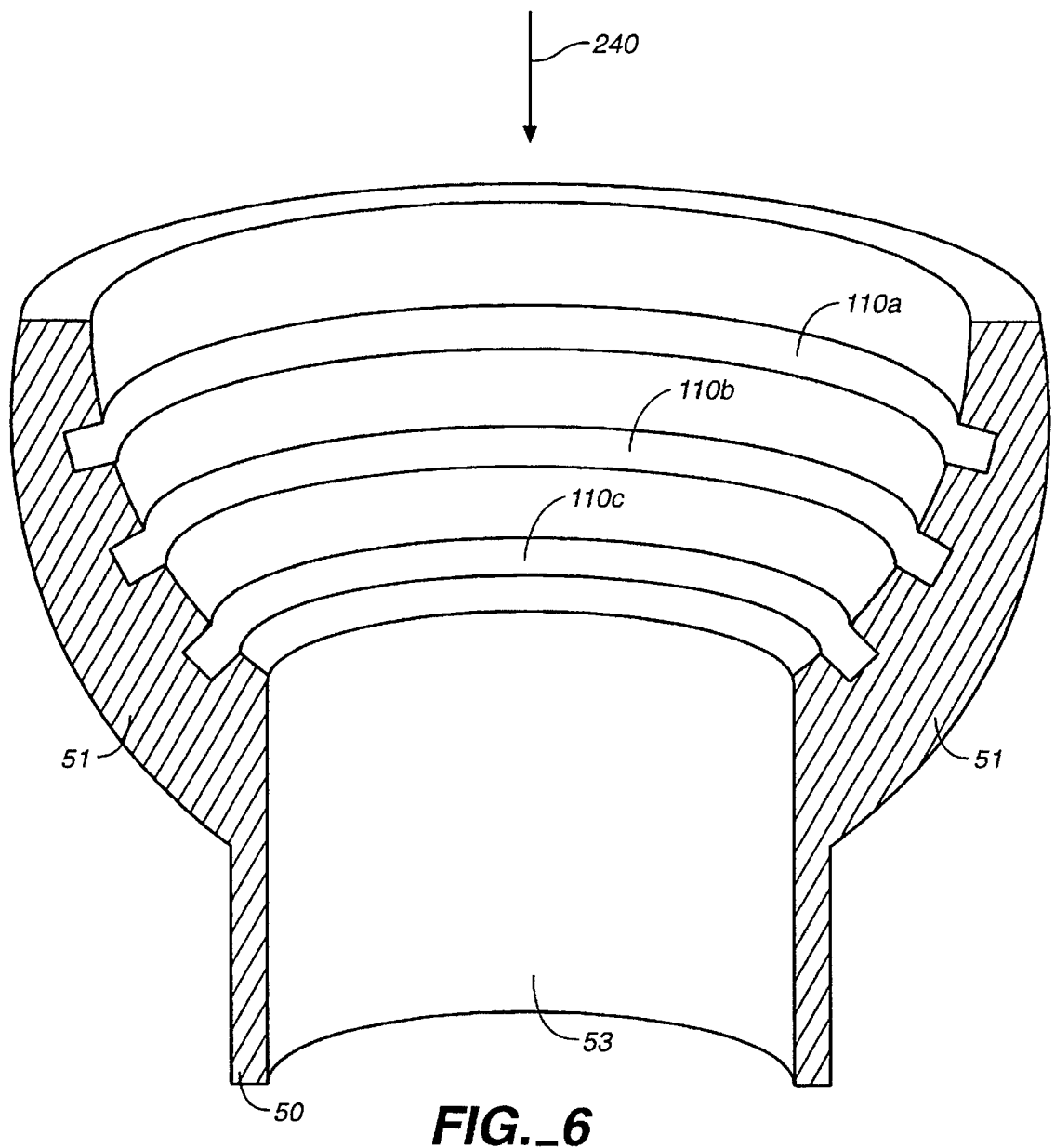
FIG._6

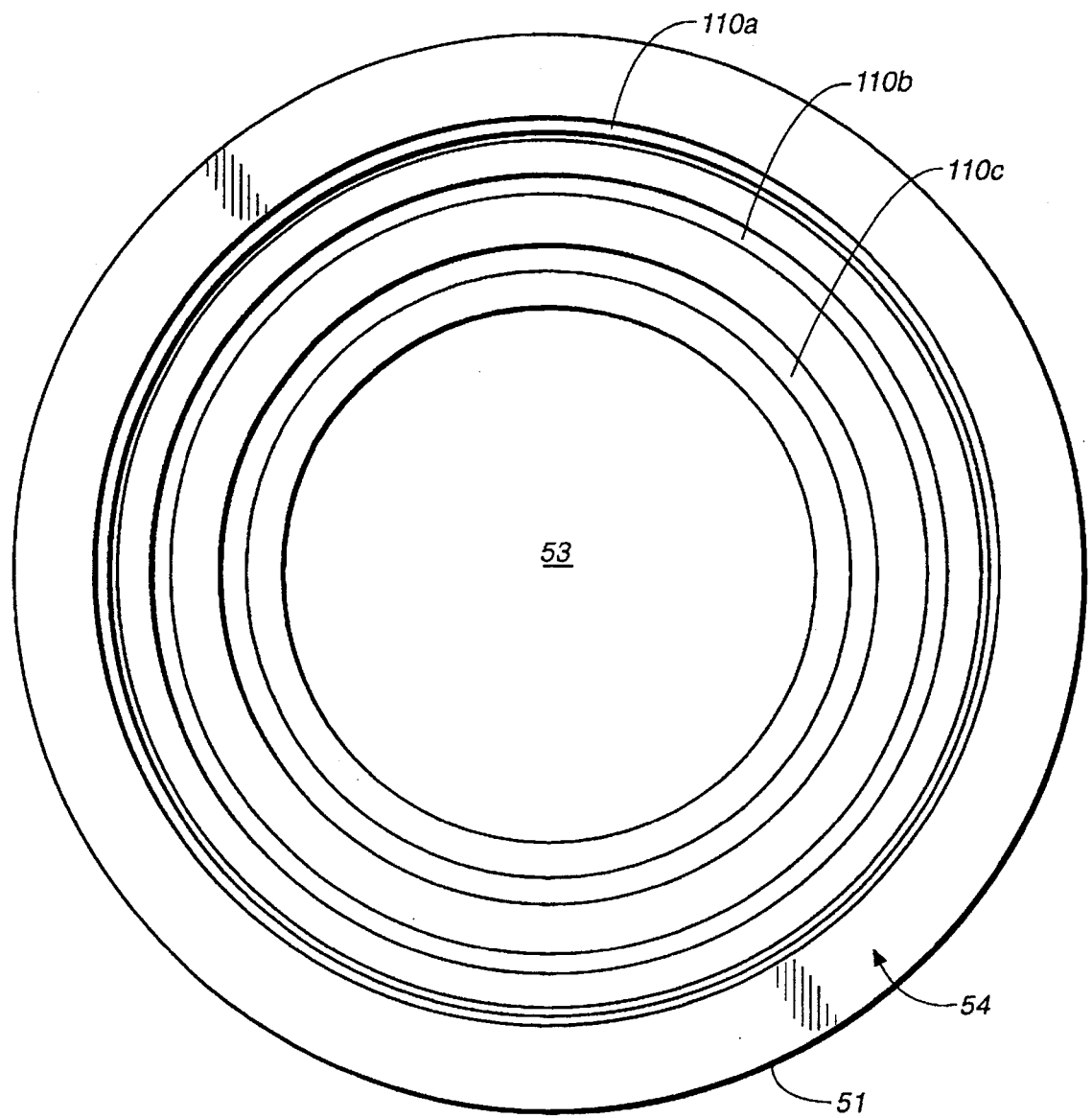
FIG._7

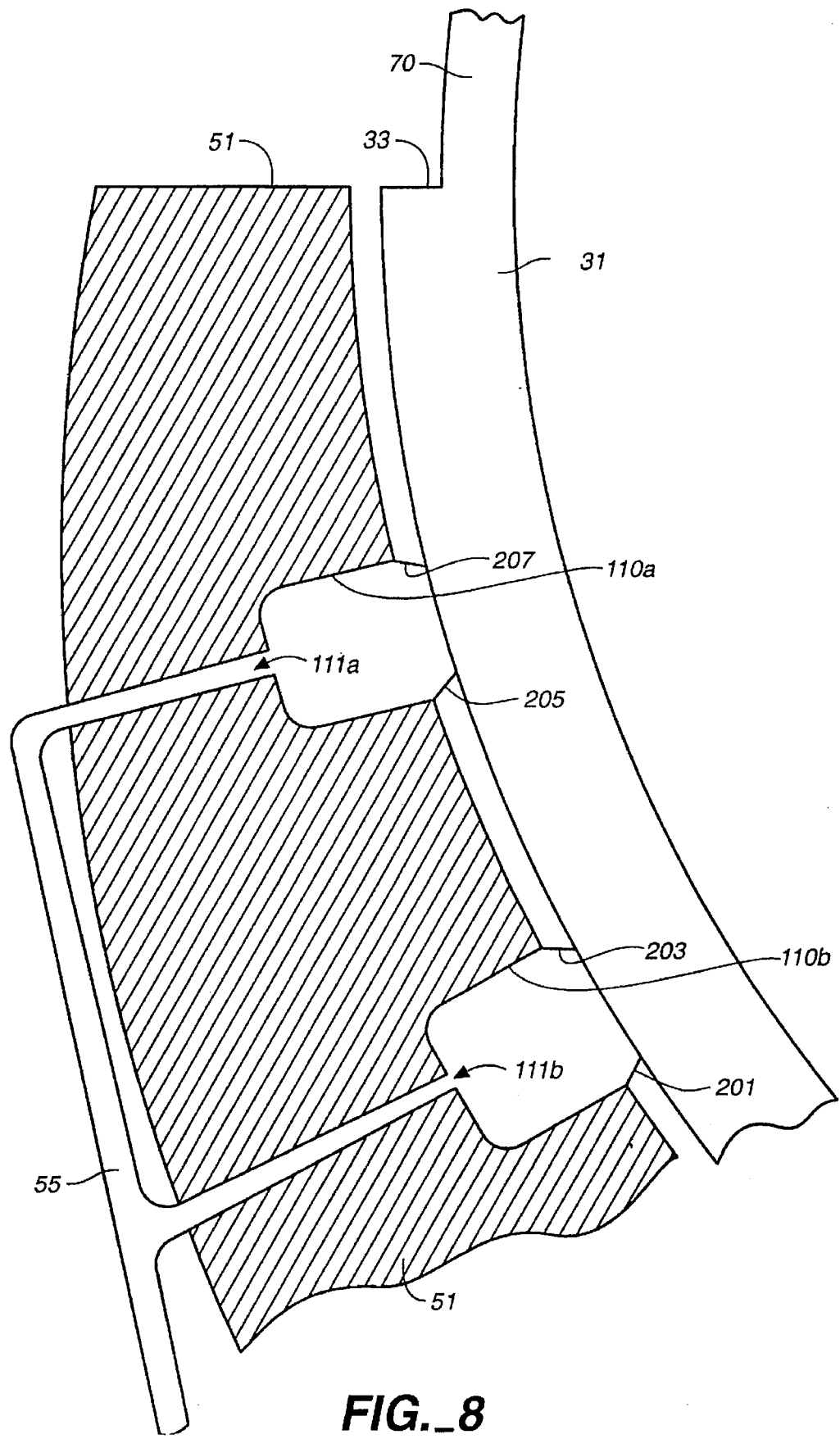
FIG._8

VACUUM SEAL FOR A BALL JUNCTION

TECHNICAL FIELD

The present invention relates to the field of vacuum seals. More specifically, the present invention relates to a vacuum seal for low pressure chemical vapor deposition applications.

BACKGROUND ART

Semiconductor substrates are fabricated using low pressure chemical vapor deposition (LPCVD) processes. During this process, an LPCVD chamber is used to contain semiconductor substrates and certain chemicals at high temperatures. The LPCVD chamber is heated up using a heat producing lamp or coil furnace as is known in the art. During the LPCVD processes, the LPCVD chamber is evacuated to form a vacuum therein at a pressure roughly at 1 mTorr.

FIG. 1 illustrates a prior art arrangement for an LPCVD process. The LPCVD chamber 10 in this example is a quartz tube. Chamber 10 contains the semiconductor substrates 15 (also called "wafers"). A quartz ball socket 14a is coupled to chamber 10 using a quartz neck 12. The end of the quartz tube containing the neck 12 and the ball socket 14a is called the "back" end. A low pressure vacuum system 20 (e.g., 760 Torr to 1 m Toro is coupled to a stainless steel vacuum line 18 (pumping line) which is coupled to a stainless steel ball cover 14b. The ball cover 14b and the quartz ball socket 14a comprise the ball junction 14 of FIG. 1 which is used as an interface between the LPCVD chamber 10 and the vacuum system 20.

FIG. 2 illustrates the prior art ball junction arrangement of FIG. 1. This ball junction uses an elastomer O-ring gasket. An O-ring gasket 30 is inserted into the ball junction between the quartz ball junction 14a and the metal cover 14b to provide a seal for the prior art ball junction.

FIG. 3A is an illustration of the metal ball cover 14a looking down direction 25 of FIG. 2. FIG. 3B is a cross section illustration of the metal ball cover 14a. With reference to FIG. 3A and FIG. 3B, a thin receiving groove 23 is cut within the metal ball cover 14a for receiving the O-ring gasket 30. In this way, the O-ring gasket 30 provides a seal between the metal ball cover 14b and the quartz ball socket 14a.

A problem with this prior art design is that the O-ring elastomer 30 becomes denatured at temperatures near 180 degrees Celsius and above. However, the temperature-of the chamber 10 during LPCVD processing is typically maintained at 800 degrees Celsius (e.g., at the end near the heat lamps). A temperature gradient is established wherein the temperature at the back end of the quartz tube (e.g., near the neck 12 and the ball socket 14a) is maintained at around 140 degrees Celsius so as to not denature the O-ring socket whereas the other end of the tube is much hotter.

At slow pump, when the heated contents of the LPCVD chamber 10 are pumped out through the prior art ball junction, it is very difficult to precisely maintain the back-end temperature to 180 degrees Celsius. During slow pump, heat conducts as the tube pumps down during high gas load pumping from 760 Torr to 2 Torr. The neck 12 and ball socket 14a junction will continue to elevate in temperature determined by time and pressure, causing the O-ring 30 to fail (e.g., denature) which causes vacuum leaks. Therefore, maintaining the back end temperature to 180 degrees is very difficult during slow pump, and if not done precisely, causes the O-ring 30 to denature.

Another problem with the above prior art design is that chemicals (e.g., ammonium chloride) used for LPCVD processes tend to condense around the ball junction if the back end temperature is not maintained high enough (e.g., above 140 Degrees Celsius). Resublimation of ammonium chloride create unwanted haze and particulates that build up within the chamber and will reduce yield. The prior art requires a delicate temperature balance at the ball junction where temperatures above 180 degrees Celsius cause O-ring denaturing while temperatures below 140 degrees Celsius cause unwanted chemical condensation. It would be advantageous to eliminate this required delicate temperature regulation, avoid the chemical condensation problem, and also avoid the O-ring denaturing problem. The present invention offers such a ball junction seal.

Accordingly, the present invention provides a ball junction that does not require delicate back end temperature regulation and thus decreases the complexity of the overall LPCVD process. Using the present invention, the back end of the LPCVD chamber can be operated at a temperature of 800 degrees Celsius during slow pump without denaturing any seal. At this temperature, chemical condensation is not a problem and yields improve. These and other advantages of the present invention will become apparent within discussions of the present invention herein.

DISCLOSURE OF THE INVENTION

A vacuum seal within a ball junction is described. The vacuum seal exists between a low pressure chemical vapor deposition (LPCVD) chamber and a vacuum system. In one implementation, the LPCVD chamber is a quartz tube used for deposition of certain chemicals onto and into semiconductor substrates placed therein. The ball junction is formed by the combination of a ball socket coupled at the neck of the LPCVD chamber and a metal ball cover coupled to the vacuum system. In one implementation, the metal ball cover is stainless steel. In lieu of using an elastomer O-ring that can denature under certain temperature ranges, the novel vacuum seal contains a series of annular channels cut into the inside surface of a ball cover. When the ball socket is inserted into the metal ball cover, the channels are bounded by metal on three sides and by the outside surface of the ball socket on the fourth side. Each channel contains a hole coupled to a second vacuum system. The channels are evacuated by the second vacuum system such that the outside surface of the ball socket seals with the inside surface of the metal cover. This vacuum seal is sufficient to contain a rough vacuum (e.g., 760 Torr to 1 m Torr) required during LPCVD. Since the O-ring is eliminated, there is no need to temperate regulate the novel ball junction to prevent the O-ring from denaturing and temperatures can be maintained at the ball junction to prevent unwanted sublimation from chamber chemicals (e.g., ammonium chloride).

Specifically, embodiments of the present invention include a ball cover for a ball junction, the cover comprising: a hemispherical shaped piece of cover material adapted for coupling to a vacuum system on a first end; a series of annular shaped channels cut into an inner surface of the hemispherical shaped piece of cover material proximate to a second end of the hemispherical shaped piece of cover material; and a plurality of pumping holes cut into an outside surface of the hemispherical shaped piece of cover material, wherein a separate pumping hole is cut to reach each of the series of annular shaped channels; the plurality of pumping holes adapted for coupling to a pumping line such that provided a ball socket is inserted into the second end of the hemispherical shaped piece of cover material, a vacuum can be created within each of the series of annular shaped channels for sealing the ball socket to the hemispherical shaped piece of cover material.

Embodiments of the present invention include the above and wherein the hemispherical shaped piece of cover material is composed of stainless steel and wherein corners of each of the series of annular shaped channels have knife edges disposed there across for interfacing with the ball socket when the ball socket is inserted into the second end of the hemispherical shaped piece of cover material. Embodiments of the present invention include the above and wherein the series of annular shaped channels comprise at least three channels.

BRIEF DESCRIPTION OF THE DRAWINGS

FIG. 1 is a prior art LPCVD arrangement having an O-ring ball junction seal.

FIG. 2 is an illustration of a prior art ball junction seal having a quartz ball socket, an O-ring gasket, and a metal ball cover.

FIG. 3A illustrates an inner view of the metal ball cover of FIG. 2 to illustrate the O-ring receiving groove.

FIG. 3B is a cross sectional view of the metal ball cover of FIG. 3A illustrating a cross section of the O-ring receiving groove.

FIG. 4A is a cross sectional view of the metal ball cover of the present invention illustrating the vacuum channels and eliminating the O-ring gasket.

FIG. 4B is a cross sectional view of the ball junction seal of the present invention including the metal ball cover of the present invention and the ball socket of the LPCVD chamber.

FIG. 5 is an enlarged illustration of a cross sectional view of channels of the present invention metal ball cover and also illustrates channel holes and their pumping lines.

FIG. 6 illustrates the metal ball cover of the present invention sliced down the vertical showing half of the annular channels cut within the metal ball cover.

FIG. 7 is an illustration down the inside surface of the metal ball cover of the present invention showing the top view of all of the annular channels of the present invention.

FIG. 8 is a cross sectional view of the metal ball cover of the present invention interfaced with the outside surface of the ball socket using knife edges to increase the channel vacuum seal.

FIG. 9 is an illustration of the LPCVD arrangement in accordance with the present invention vacuum sealed ball junction having a secondary vacuum system to maintain the channel seal.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details, or by using alternate elements or methods. In other instances well known methods, procedures, components, and processes have not been described in detail as not to unnecessarily obscure aspects of the present invention.

With reference to FIG. 4A, a cross sectional view of the hemispherical shaped metal ball cover 51 of the present invention is shown. The present invention ball junction eliminates the elastomer O-ring gasket used to seal the ball junction of the prior art. In lieu of the O-ring gasket, the present invention utilizes a series of annular shaped channels ("channels") 110a–110c that are cut into the inside surface of the metal ball cover 51. The implementation shown in FIG. 4A contains three such channels 110a–110c, however, it is appreciated that the present invention can be practiced with more (e.g., four or more) or fewer (e.g., two or less) channels and these alternative implementations are considered equally within the scope of the present invention.

When a ball socket of an LPCVD chamber is inserted into the metal ball cover 51 of FIG. 4A, the channels 110a–c of the present invention are evacuated by a vacuum system to create a vacuum seal between the channel walls and the surface of the ball socket thus providing an effective vacuum seal for LPCVD processing and that does not require the O-ring gasket.

Each channel of FIG. 4A contains at least one small pumping hole, e.g., 111a for channel 110a, that is coupled to a pumping line 55. The pumping holes are used to evacuate the channel when the ball socket is inserted in the metal ball cover 51. On the left side of FIG. 4A the following pumping holes are used, channel 110a is coupled to pumping line 55 via pumping hole 111a, channel 110b is coupled to pumping line 55 via pumping hole 111b, and channel 110c is coupled to pumping line 55 via pumping hole 111c. On the right side of FIG. 4A the following pumping holes are used, channel 110a is coupled to pumping line 55 via pumping hole 113a, channel 110b is coupled to pumping line 55 via pumping hole 113b, and channel 110c is coupled to pumping line 55 via pumping hole 113c. Although each channel in FIG. 4A is coupled to pumping line 55 via two pumping holes, the present invention can be practiced using implementations wherein only one pumping hole is used for each channel. The present invention can also be practiced using implementations where more than two pumping holes are used for each channel.

The pumping line 55 is coupled to a secondary vacuum system 62, which in one embodiment is isolated from the vacuum system used for the LPCVD process of the present invention (e.g., vacuum system 60 of FIG. 9). Vacuum system 62 is used to evacuate the channels 110a–c. When a ball socket from an LPCVD chamber is inserted into the metal ball cover 51 of the present invention, the opening or slit of each of the annular channels 110a–110c of the metal ball cover 51 is sealed by the outer surface of the ball socket. At this time, vacuum system 62 creates a vacuum of about 1 mTorr pressure in the channels 110a–110c causing the ball socket surface to seal against the metal ball cover 51 for low pressure (e.g., rough vacuum) applications. Herein rough vacuum applications mean a pressure range between 1 mTorr and 760 mTorr.

Refer to FIG. 4B and FIG. 4A. FIG. 4B, illustrates a cross sectional view of the metal ball cover 51 of the present invention with the ball socket 32 (composed of surface 31 and 33) of an LPCVD chamber being inserted therein. The ball socket 32 and the metal ball cover 51 comprise the ball junction of the present invention. The neck tube 70 is also shown in FIG. 4B and is coupled to the ball socket 32. When the ball socket 32 is fully inserted into the metal ball cover 51 of the present invention, Vacuum system 62 pumps over pumping lines 55 to create a vacuum within channels 110a–110c. The resulting suction holds the outer surface 31 of ball socket 32 to the inner surface 54 of the metal ball cover 51 of the present invention. The suction remains during LPCVD processes to seal the ball junction.

In an ideal system, the pressure level within each channel of 110a–c should be the same. For LPCVD applications, a uniform pressure of 1 mTorr within each channel of 110a–c is sufficient to seal the outer surface 31 of the ball socket 32 to the inner surface 54 of the metal ball cover 51. However, in practice, leakage within the channels 110a–c establishes a pressure gradient across the channels wherein channel 110a, the closest channel to atmospheric pressure (ATM), rests just below 760 Torr. The middle channel, 110b, rests approximately between 760 Torr and 1 mTorr (e.g., 500 Torr) and channel 110c rests approximately at 1 mTorr. The above pressure gradient is exemplary only and the present invention can be practiced using other pressure distributions as long as surface 54 and the outer surface of 31 of the ball socket are tightly coupled to prevent leakage.

At the above pressure gradients, channels 110a–c create enough suction to seal the outer surface 31 of the ball socket against the inner surface 54 of metal ball cover 51. The vacuum seal established as described above effectively seals the ball junction of the present invention allowing the LPCVD chamber 75 (FIG. 9) to be evacuated by vacuum system 60 (FIG. 9) without leakage during LPCVD processes. During LPCVD processes, material is pumped via vacuum system 60 (FIG. 9) through pumping line 53 and through inlet 35 of the ball socket to and from the LPCVD chamber 75 (FIG. 9).

With reference to FIG. 5, two channels 110a and 110b of the metal ball cover 51 of the present invention are shown in more detail. In one implementation, each channel is 60 thousands of an inch ($^{60}/_{1000}$) across dimension 130 (e.g., depth) and 60 thousands of an inch across dimension 125 (e.g., width). The present invention can be practiced with larger or smaller dimensions and the above dimensions are exemplary only. In one implementation, the length of each channel extends around the inside surface 54 of metal ball cover 51 (see FIG. 7). As shown in FIG. 5, the pumping hole 111a for channel 110a is coupled to, pumping line 55. As described above, each channel has a similar pumping hole. In one implementation, the pumping hole is roughly 25 thousands of an inch in diameter and can be roughly circular in shape. The present invention can be practiced with pumping holes having larger or smaller diameter dimensions, and the above dimension is exemplary only as long as the hole provides adequate pumping effectiveness to create a vacuum within the associated channel when the ball socket 32 is inserted in the metal ball cover 51.

It is appreciated that the dimensions of the channels 110a–c and of the pumping holes 111a–c can vary and the difference can depend on the thickness of the sides of the metal ball cover 51 of the present invention. In one implementation, the sides of the metal ball cover 51 are between ⅛ and ¼ inch thick, but the present invention can be practiced with metal ball covers 51 of larger or smaller thicknesses depending on the material used. In one implementation, the metal ball cover 51 is composed of stainless steel, but can also be composed of other well known materials used for LPCVD processes.

The material composition of the pumping lines 55 can vary within the scope of the present invention, but in one implementation the pumping lines 55 are stainless steel. The ball socket 32 used in the present invention can be composed of a variety of well known materials for LPCVD processes. In one particular implementation the ball socket 32 is composed of quartz.

FIG. 6 is a cross sectional view of the hemispherical shaped metal ball cover 51 of the present invention with one half of the inner surface 54 of metal ball cover 51 exposed to show the annular shape of channels 110a, 110b, and 110c. In the embodiment shown in FIG. 6, the channels 110a–c are continuous in an annular shape, but they need not be continuous within the present invention. Implementations can be used where a channel is segmented into channel segments. Implementations using segmented channels require a separate pumping hole for each channel segment. Pumping line 53 is shown and leads to vacuum system 60 (FIG. 9). The side walls 50 of line 53 are also shown in FIG. 6.

FIG. 7 is an illustration of the hemispherical shaped metal ball cover 51 of the present invention as viewed along direction 240 (of FIG. 6). In this view, the annular shape of the channels 110a–c is clearly shown. At the center of metal ball cover 51 is shown a cross section of the pumping line 53 which leads to vacuum system 60 (FIG. 9). Again, in this implementation the channels 110a–c are annular and continuous, but they can be segmented in alternative embodiments of the present invention. The channels 110a–c are cut into the sides of the metal cover 51 at an appropriate depth and width for vacuum sealing against the outside surface 31 of the ball socket 32 of the LPCVD chamber. The placement of the channels 110a–110c with respect to the inside surface 54 is not critical as long as the channels are placed within surface 54. Since surface 54 interfaces with the ball socket surface 31 and since pumping line 53 interfaces with vacuum system 60, it is said that the channels 110a–110c are proximate to the end of the metal ball cover 51 that receives the ball socket.

FIG. 8 illustrates an embodiment of the present invention using knife edges placed along the corners of the channels 110a–c to provide more secure sealing in certain applications. Knife edges 207 and 205 are applied to the two corners of channel 110a. FIG. 8 shows cross sections of the knife edges 207 and 205 that are disposed at the corners of the channel 110a. These thin metal protrusions 207 and 205 (e.g., stainless steel) have well defined tips that interface with the outer surface 31 of the ball socket 32 to create a seal there between. Other materials can also be used for the knife edges. Analogous knife edges 203 and 201 are also disposed with respect to channel 110b and separate knife edges can be used for channel 110c (not shown).

FIG. 9 is an exaggerated illustration of an overall LPCVD system 310 in accordance with the present invention. System 310 contains an LPCVD chamber 75 coupled to neck tube 70 coupled to a ball socket 32 (of which only surface 33 is visible). In one implementation, the LPCVD chamber 75 is approximately 7 feet long and 240 mm in diameter, however a number of well known LPCVD chambers can be used in accordance with the present invention. Surface 31 of the ball socket 32 is inserted into the metal ball cover 51. Semiconductor wafers 15 are placed into the chamber 75 for LPCVD. Although not shown, system 310 contains heating elements to heat the contents of chamber 75. The metal ball cover 51 is coupled to pumping line 53 which is coupled to a primary vacuum system 60. Vacuum system 60 is used for the LPCVD processes (in one implementation, a nitride process can be used). Secondary vacuum system 62 is used to create the vacuum seal of the ball junction of the present invention. System 62 is coupled to pumping lines 55 which are coupled to pumping holes 111a–c and 113a–c in the metal ball cover 51 that lead to channels 110a–c. The ball junction of the present invention is composed of ball socket 32 and metal ball cover 51.

When in operation, after the ball socket 32 is placed into metal cover 51 and properly aligned, vacuum system 62 pumps out channels 110a–110c to create a vacuum therein. This vacuum seals the outer surface 31 of the ball socket 32 against the inner surface 54 of the metal ball cover 51 causing a vacuum seal there between. Once this vacuum seal is established, vacuum, system 60 can proceed with the LPCVD processes using well known methods.

By eliminating the elastomer O-ring gasket of the prior art, the temperature at the ball junction of the present invention system 310 does not need to be regulated to 140 degrees Celsius and can reach 800 degrees Celsius without defect. At this temperature, no ammonium chloride condensation and resumblimation occurs, and therefore, no haze or particles are present (attributed to ball socket condensation) during LPCVD processes in accordance with the present invention. Since the temperature at the ball junction of the present invention does not to be regulated, the LPCVD process are less complex and can be performed faster using the present invention. Since ammonium chloride does not condense and therefore resublimate, the yields on semiconductors manufactured with the present invention are higher over the O-ring systems of the prior art.

The preferred embodiment of the present invention, a vacuum sealed ball junction for LPCVD applications that does not utilize an O-ring gasket, is thus described. While the present invention has been described in particular embodiments, it should be appreciated that the present invention should not be construed as limited by such embodiments, but rather construed according to the below claims.

What is claimed is:

1. A ball cover for a ball junction, said cover comprising:
a hemispherical shaped piece of cover material adapted for coupling to a vacuum system on a first end;
a series of annular shaped channels cut into an inner surface of said hemispherical shaped piece of cover material proximate to a second end of said hemispherical shaped piece of cover material; and
a plurality of pumping holes cut into an outside surface of said hemispherical shaped piece of cover material wherein a separate pumping hole is cut to reach each of said series of annular shaped channels;
said plurality of pumping holes adapted for coupling to a pumping line such that provided a ball socket is inserted into said second end of said hemispherical shaped piece of cover material, said series of annular shaped channels are for creating a vacuum therein to seal said ball socket to said hemispherical shaped piece of cover material; and
wherein corners of each of said series of annular shaped channels have knife edges disposed there across for interfacing with said ball socket when said ball socket is inserted into said second end of said hemispherical shaped piece of cover material.

2. A ball cover as described in claim 1 wherein said hemispherical shaped piece of cover material is composed of stainless steel.

3. A ball cover as described in claim 1 wherein each of said series of annular shaped channels is approximately 60 thousands of an inch wide and approximately 60 thousands of an inch deep.

4. A ball cover as described in claim 1 wherein said series of annular shaped channels comprise at least two channels.

5. A ball cover as described in claim 1 wherein said series of annular shaped channels comprise at least three channels.

6. A system for low pressure chemical vapor deposition, said system comprising:
a hemispherical shaped piece of cover material adapted for coupling to a first vacuum system on a first end;
a series of annular shaped channels cut into an inner surface of said hemispherical shaped piece of cover material proximate to a second end of said hemispherical shaped piece of cover material;
a plurality of pumping holes cut into an outside surface of said hemispherical shaped piece of cover material wherein a separate pumping hole is cut to reach each of said series of annular shaped channels;
a pumping line coupled to each of said plurality of pumping holes; and
a second vacuum system coupled to said pumping line, wherein provided a ball socket is inserted into said second end of said hemispherical shaped piece of cover material, said second vacuum system is for creating a vacuum within each of said series of annular shaped channels for sealing said ball socket to said hemispherical shaped piece of cover material; and
wherein corners of each of said series of annular shaped channels have knife edges disposed there across for interfacing with said ball socket when said ball socket is inserted into said second end of said hemispherical shaped piece of cover material.

7. A system as described in claim 6 wherein said hemispherical shaped piece of cover material is composed of stainless steel.

8. A system as described in claim 6 wherein each of said series of annular shaped channels is approximately 60 thousands of an inch wide and approximately 60 thousands of an inch deep.

9. A system as described in claim 6 wherein said series of annular shaped channels comprise at least two channels.

10. A system as described in claim 6 wherein said series of annular shaped channels comprise at least three channels.

11. A system as described in claim 6 further comprising said first vacuum system for creating a vacuum within an LPCVD chamber coupled to said ball socket provided said ball socket is inserted into said second end of said hemispherical shaped piece of cover material.

12. A system for low pressure chemical vapor deposition, said system comprising:
a hemispherical shaped piece of cover material adapted for coupling to a first vacuum system on a first end;
a series of annular shaped channels cut into an inner surface of said hemispherical shaped piece of cover material proximate to a second end of said hemispherical shaped piece of cover material;
a plurality of pumping holes cut into an outside surface of said hemispherical shaped piece of cover material wherein a separate pumping hole is cut to reach each of said series of annular shaped channels;
a pumping line coupled to each of said plurality of pumping holes;
a ball socket inserted into said second end of said hemispherical shaped piece of cover material; and
a second vacuum system coupled to said pumping line, said second vacuum system for creating a vacuum within each of said series of annular shaped channels for sealing said ball socket to said hemispherical shaped piece of cover material; and
wherein corners of each of said series of annular shaped channels have knife edges disposed there across for interfacing with said ball socket.

13. A system as described in claim 12, wherein said hemispherical shaped piece of cover material is composed of stainless steel and wherein said ball socket is composed of quartz.

14. A system as described in claim 12 wherein said series of annular shaped channels comprise at least three channels.

15. A system as described in claim 12 further comprising:

an LPCVD chamber coupled to said ball socket; and said first vacuum system for creating a vacuum within said LPCVD chamber.

16. A method of creating a ball junction for low pressure chemical vapor deposition, said method comprising the steps of:

(a) placing a ball socket into a first end hemispherical shaped piece of cover material, said hemispherical shaped piece of cover material having (1) a series of annular shaped channels cut therein proximate to said first end and (2) a plurality of pumping holes cut therein wherein a separate pumping hole is cut to reach each of said series of annular shaped channels, wherein corners of each of said series of annular shaped channels have knife edges disposed there across for interfacing with said ball socket;

(b) coupling a pumping line to each of said plurality of pumping holes; and (c) sealing said ball socket to said hemispherical shaped piece of cover material by using a vacuum system coupled to said pumping line to evacuate said series of annular shaped channels creating a sealing vacuum therein.

17. A method as described in claim 16 further comprising the steps of:

(d) coupling another vacuum system to a second end of said hemispherical shaped piece of cover material; and (e) evacuating an LPCVD chamber coupled to said ball socket, said step of evacuating performed using said another vacuum system.

* * * * *